United States Patent [19]
Smith et al.

[11] Patent Number: 5,258,578
[45] Date of Patent: Nov. 2, 1993

[54] CLOSURE END SEAL

[75] Inventors: Russell P. Smith, Georgetown; Thomas S. Croft, Austin, both of Tex.

[73] Assignee: Minnesota Mining and Manufacturing Company, St. Paul, Minn.

[21] Appl. No.: 837,327

[22] Filed: Feb. 18, 1992

[51] Int. Cl.$^5$ .............................................. H02G 15/08
[52] U.S. Cl. ................................... 174/93; 174/77 R; 174/92
[58] Field of Search ............... 174/77 R, 74 R, 74 A, 174/92, 93, 88 R

[56] References Cited

U.S. PATENT DOCUMENTS

| | | | |
|---|---|---|---|
| 3,781,459 | 12/1973 | Peek | 174/94 |
| 4,409,430 | 10/1983 | Boscher et al. | 174/92 |
| 4,622,436 | 11/1986 | Kinnan | 174/77 R |
| 4,864,725 | 9/1989 | Debbaut | 174/93 X |
| 4,880,676 | 11/1989 | Puigcerver et al. | 174/77 R X |
| 4,902,855 | 2/1990 | Smith | 174/77 |
| 4,962,286 | 10/1990 | Jensen et al. | 174/92 |
| 4,963,698 | 10/1990 | Chang | 174/77 |

FOREIGN PATENT DOCUMENTS

| | | |
|---|---|---|
| 1168267 | 8/1958 | France . |
| WO86/06316 | 5/1986 | PCT Int'l Appl. . |
| WO90/05401 | 11/1989 | PCT Int'l Appl. . |
| 2239136A | 6/1991 | United Kingdom . |

Primary Examiner—Morris H. Nimmo
Attorney, Agent, or Firm—Gary L. Griswold; Walter N. Kirn; John C. Barnes

[57] ABSTRACT

An end seal for splice closures or for terminals comprising a core portion of a flexible resilient material, which core portion has an outer periphery and openings extending through the core portion, which openings communicate with the outer periphery, and a tail portion which is integral with and extends from the core portion periphery to be wrapped about the core portion and the cables placed in the openings thereof for filling the space between the core portion and the closure end surface.

17 Claims, 2 Drawing Sheets

CLOSURE END SEAL

BACKGROUND OF THE INVENTION

1. Field of the Invention

The present invention generally relates to a conformable self sealing seal for the cables entering an end of a closure for a cable splice or termination, and in one aspect to an improved environmental seal to restrict migration of fluids into or out of a closure.

2. Description of the Prior Art

The prior art related to end seals for splice closures for cable splice closures or terminations is replete with systems for fitting a variety of wire or cable diameters and a variety of closure ends. One of these end seals is described in U.S. Pat. No. 4,902,855 and assigned to the assignee of the present application. This end seal comprises a foam collar which is fitted about the cable or cables and an annular ring is placed about the collar and it is cut to fit about a cable on a finished splice, and the ring has a cut which joins the inner opening to the outer periphery and along a path which is tangential to the inner opening.

U.S. Pat. No. 4,963,698 describes a sealed cable article and method for sealing the area between two cables and an enclosure where the cables exit from the closure. The article comprises a shaped article of polymeric gel having a cone penetration value of about 30 to about 400 ($10^{-1}$ mm) and an elongation of from 25% to about 850%. The gels are widely known in the art, for example silicone-based gels, polyurethane-based gels or polystyrenebutadienestyrene, polystyrene-isoprene-styrene, and polystyrene-ethylene butylene-styrene block copolymer based gels. The inventors preferred gelloid compositions comprising a crosslinked non-silicone polymer having an olefinic unsaturated content of less than 10 mole percent and having dispersed therein a liquid in an amount of from about 20% to about 95% by weight based on the weight of the liquid and polymer and from 0 to 0.3 volume fraction of a filler. The shaped article preferably has a number of holes preferably slightly smaller than the size of the cables. The gel will stretch to accommodate the increased size cables. There is a slit extending from the edge of each hole to the outer edge of the article so that the shaped article may be placed around the cables without access to the free end of the cable. FIGS. 4, 5 and 6 illustrate the shapes of the article.

Articles of a similar shape are illustrated in French patent 1,168,267, in FIGS. 18, 19 and 20. PCT application WO 90/05401, published May 17, 1990 also discloses an end seal to fit about a plurality of cables and which is made of a gel, i.e. a liquid-extended polymer composition preferably having a cone penetration value within the range from 30 to 400 ($10^{-1}$ millimeters), an ultimate elongation greater than 100%, with substantially elastic deformation to an elongation of at least 100%. The composition may either contain three-dimensional cross-linked molecular formations or may merely behave as if it contained such molecular formations (gelloids). Specific examples and preferred properties are disclosed and on page 12 there is a teaching that the gel may include a tackifier which helps adhesion of the gel to the substrate and also to itself.

These references of prior art end closures do not disclose an end seal article which is capable of sealing a variety of cable and wire sizes to a closure, or closures of different diameters, and which comprises a core portion with a plurality of openings communicating with the outer periphery and a wrap-around tail portion which is adapted to make at least one complete wrap about the periphery of the core portion to seal between the cables and about the cables to the inner surface of the closure.

SUMMARY OF THE INVENTION

The present invention provides an end seal for use in sealing the area at the end of a closure, or terminal, through which cables are positioned and seal the area about the cables to restrict moisture from entering the closure by means of an integral core and wrapped tail portion.

The end seal is adapted to seal the space between the cables and between the cables and the closure to restrict fluid transfer through the seal, the seal comprising a body of an elastic, flexible material. One such material is a gel material which may have a self-adhesive property. The body comprises a core portion and a tail portion. The core portion has an outer peripheral surface and opposite ends, and wall means forming at least a pair of cylindrical openings through the core portion between the ends. The wall means forming each opening begins and ends at the peripheral surface defining arcuate surfaces in the core portion such that each opening communicates with the outer peripheral surface of the core portion to define an entrance slot to each opening. The tail portion is integral with and extends from the surface of the core portion with the tail portion having sufficient length to wrap about the outer peripheral surface of the body to cover all the entrance slots of the openings. One surface of the tail extends generally tangential from the wall means defining an opening and terminates in a taper to an edge of reduced thickness.

The core portion can have different shapes to correspond to the ends of the closures, it can be oblong, circular, ellipsoidal or other shape with convex peripheral surfaces and it is formed with a plurality of openings communicating with the periphery. The openings can have different sizes, i.e. diameters.

The openings are generally smaller than the outer diameter of the cables to be placed in the openings and the core is elastic to stretch about the outer surface of the cable and the tail will seal the portion of the cable between the core portion and the inside surface of the closure.

The tail portion can taper to a narrower free end, it can taper transversely such that the edges of the tail have different thickness toward the free end, or be conical in cross section to form a conical seal when wrapped about the cables, the tail portion can be slit to afford facile shortening of the tail portion, the tail portion can be formed with a ridge or rib on one surface and a groove on its opposite surface to increase the force needed to displace the wrapped tail portions in an axial direction.

BRIEF DESCRIPTION OF THE DRAWINGS

The present invention will be further described hereinafter with reference to the accompanying drawing wherein.

DESCRIPTION OF THE PRESENTLY PREFERRED EMBODIMENTS

Figure 1:
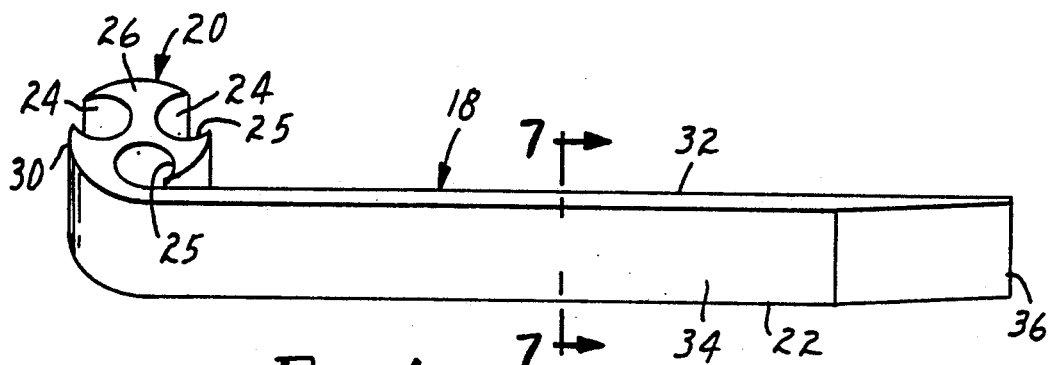
FIG. 1 is a perspective end view of the end seal formed according to one embodiment of the present invention.

The end seal of the present invention is adapted for use in sealing the end of an aerial closure, a buried closure or a pedestal closure to restrict fluid from entering or escaping the closure.

The end seal of the present invention will now be described in greater detail with reference to the accompanying drawing wherein like reference numerals refer to like parts throughout the several views.

The end seal 15 is formed of a material which can be cast or molded into a solid body or extruded and cut into separate end seals. Preferred materials are gels having elongations at break of at least 100%, more preferably, 200%; shore 00 values of from about 10 to about 50 and a ¼ cone penetration value of between about 10 to about 60. Useful gels include polyurethanes and polyesters. Preferred gels comprise polyurethanes, polyureas and mixtures thereof, which are derived from the reaction of polyisocyanates with liquid or quasi-liquid polyols, or polyamines.

Useful organic isocyanate components include any suitable isocyanate having the required functionality, e.g., diisocyanates; the term isocyanate also includes isocyanate-terminated prepolymers. Polyisocyanates may be linear or branched, aliphatic, cycloaliphatic, araliphatic, heterocyclic or aromatic. Examples of such include dimer acid diisocyanate (DDI), isophorone diisocyanate (IPDI, 1-isocyanato-3,3,5-trimethyl-5-isocyanatomethyl-cyclohexane), 4,4'-diphenylmethane diisocyanate (MDI), 4,4'-methylene-bis(cyclohexyl diisocyanate)($H_{12}MDI$) and mixtures thereof.

The isocyanate should be present in sufficient amount to provide an isocyanate index of below about 150, preferably below about 100. Equivalents for each component can be calculated by dividing the actual weight in parts of each component by the equivalent weight. The equivalent weight herein is calculated on the basis of the number of active hydrogen groups, rather than the number of active hydrogen containing atoms. The Zerewitnoff test used to determine active hydrogen is described in *Journal of the American Chemical Society*, Vol. 49, page 3181 (1927).

Polyols useful in the invention are liquid or quasi-liquid polyols with di- or trifunctional polyols performing well. Suitable polyols may be selected from polyether polyols based on ethylene oxide, propylene oxide, butylene oxide, tetrahydrofuran, epichlorohydrin or mixtures thereof, ricinoleic acid derivatives, e.g., castor oil, polyester polyols, polyamide or polyesteramide polyols, tertiary amine containing polyols, e.g., ethoxylated amides, propoxylated amides or amines, polyalkadiene polyols derived from butadiene polymers or copolymers, and hydrogenated derivatives thereof, polyacetals, polycarbonates containing hydroxyl groups, polyhydroxyl (meth)acrylic resins, polythioether polyols and the like. Also useful are polyhydroxyl compounds containing finely divided organic polymers in a dispersed or dissolved form, e.g., a dispersion polymer polyol, a grafted copolymer polyol, a solution polymer polyol, or blends thereof. The polymer polyols may be polyols containing high molecular weight polyadducts such as polyureas or polyhydrazodicarbonamides or polyurethane-ureas known as PIPA or PHD polyols in the art or grafted copolymer polyols which are polyols modified by vinyl polymerization.

Suitable polymeric amines contain more than one primary or secondary amino group capable of reacting with isocyanate groups. Examples are polyoxyalkylene polyamines derived from the amination of polyether polyols with the majority of the hydroxyl groups replaced by amine groups, polyamidoamines, or polyamines derived from dimerized fatty acids, amine terminated polybutadienes, amine terminated polytetrahydrofuran, amine terminated polybutadiene-acrylonitrile copolymers, amine terminated polyethers, polyamines containing urea moieties, cyanoethylated amine terminated polyoxypropylene ethers, or mixtures thereof.

Low molecular weight chain-extending or cross-linking agents (molecular weights from about 50 to about 400) containing at least two isocyanate-reactive hydrogen atoms may also be used in accordance with the present invention. Useful examples include alkanolamines, primary or secondary, aliphatic, cycloaliphatic, aromatic, araliphatic or heterocyclic amines, low equivalent weight amine-initiated polyether polyols, ricinoleic derivatives, hydroxyl containing organophosphates, and the like.

Preferred gels also contain an extender or plasticizer. Useful hydrocarbon extenders include such groups as polyalphaolefins, cyclic polyolefins, petroleum oils, vegetable oils, castor oil, naphthenic oils, paraffinic oils, synthetic oils, hydrogenated terphenyls, pine oil or coal tar or other terpene derivatives. A variety of esters may also be used including those of adipic, phthalic, trimellitic as well as cyclopentadiene copolymers with fatty acid esters, polymeric polyesters, rosin esters, acrylate esters, epoxidized fatty materials, ricinoleic derivatives, phosphates or halogenated phosphate ester, and the like.

Any conventional catalyst used in the preparation of polyurethanes may be employed herein. Representative catalysts include the tertiary amine catalysts, including 1,8-diazabicyclo[5.4,0] undec-7-ene (DBU), and salts thereof, triethylene diamine and the like, and organometallic catalysts of tin, zinc, bismuth, lead, iron and the like. Currently preferred is BiCat 8, a bismuth/zinc neodecanoate mixture.

Preferred gel compositions also contain hollow microspheres. The microspheres may be glass, e.g., Scotchlite TM, available from Minnesota Mining and Manufacturing Company, (3M), polymeric, e.g., Expancel TM 551DE, available from Nobel Industries, UCAR microballoons, available from Union Carbide Corp., and Dualite TM M6001AE, available from Pierce & Stevens Corp., or ceramic, e.g., Zeeosphere TM X-40, manufactured by Zeelan Industries. Such microspheres may also be treated with a coupling or wetting agent such as a silane, e.g., 3-glycidoxypropyl trimethoxy silane, to enable the resin to effectively wet the microspheres.

Additional fillers may also be used, e.g., glass fibers, graphite fibers, fibrous materials, carbon black, mica, silicates, carbonates, fumed silica and the like.

Other useful materials include elastomers, mastics and closed-cell foams. Useful elastomers may be any thermoplastic elastomer which is solid at room temperature, has an elongation of from about 150% to about 500%, and a shore A hardness of about 10 to about 75. Suitable materials include natural rubber, butyl rubber, EPDM rubber, polyisoprene, polybutadiene, polyester, polyurethane, thermoplastic olefins, chloroprene rubber, styrene-butadiene copolymers (random or block), styrene-isoprene copolymers (random or block), acrylonitrile-butadiene copolymers, mixtures thereof and copolymers thereof. The block copolymers may be linear, radial or star configurations and may be diblock (AB) or triblock (ABA) copolymers or mixtures thereof.

Commercially available elastomers include those obtainable under the Kraton ™ tradename such as Kraton ™ 1107, Kraton ™ 1650, Kraton ™ 1657, and those available under the tradename Cariflex ™, both from Shell Chemical Company. Also useful are those available from Firestone under the tradename Stereon ™, those available under the tradename Hycar ™ and the like. Such elastomers may be plasticized to form mastics which are also useful, combined with other materials, or foamed, e.g., Insolite ™, available from Uniroyal.

Any of the compositions useful in end seals of the invention may also include adjuvants such as solvents, fillers, pigments, antioxidants, flow agents, fungicides, surfactants, carbon black, flame retardants and the like.

The end seal 15 comprises a body 18 having a core portion 20, 20a, 20b, 20c, and 20d and a tail portion 22, 22a, 22b, 22c and 22d, as illustrated in the several views of the drawing.

In FIG. 1 the body 18 has the core portion 20 formed of a circular shape from the end, and the core portion 18 has a plurality of openings 24 defined by semicircular walls 25 which extend between the ends 26, only one of which is shown in FIG. 1. The walls 25 begin and end at the outer peripheral surface 30 of the core portion 20 to form slot-like openings communicating with the openings 24 to permit the core portion 20 to be placed about endless cables or wires. From one of the openings 24, extends the tail portion 22. The inner surface 32 of the tail portion 22 extends from one of the openings 24 generally tangential to the wall 25 defining the opening 24 and from a position at the slotted opening. The tail portion 22 has a generally uniform thickness and cross section along its length until near the free end 36 where its thickness begins to diminish or taper to a free edge to form a smooth transition to the outer surface 34 of itself after it is wrapped about the peripheral surface 30 of the core portion and the exposed portion, if any, of a wire or cable disposed in each of the openings 24.

Figure 2:
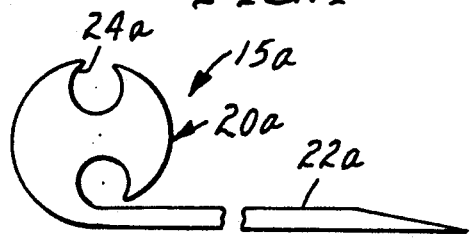
FIG. 2 is an end view of another embodiment, with the tail portion partially broken away for illustration.
Figure 3:
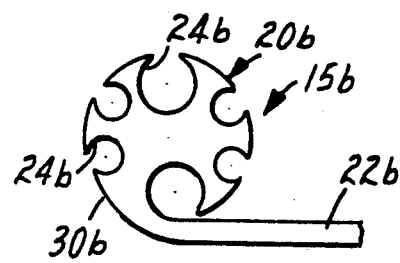
FIG. 3 is a side view of another embodiment.
Figure 4:
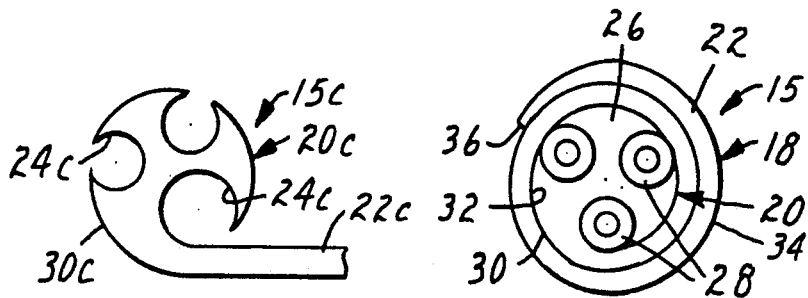
FIG. 4 is a side view of a further embodiment.

FIG. 2 illustrates an end seal 15a according to the present invention wherein the core portion 20a is formed with a pair of openings 24a. FIG. 3 illustrates an end seal 15b where the core portion 20b has openings 24b of different diameters positioned about the outer peripheral surface 30b. FIG. 4, illustrates a core portion 20c with a plurality of openings 24c which are not symmetrical.

The tail portion 22 can also have a variety of configurations. It is important however that the tail portion 22 have a length sufficient to wrap about the outer peripheral surface 30 of the core portion 22 at least once, about 360° about the center. The tail portion 22 can have any given length greater than the circumference of the outer periphery of the core portion 22, however.

Figure 5:
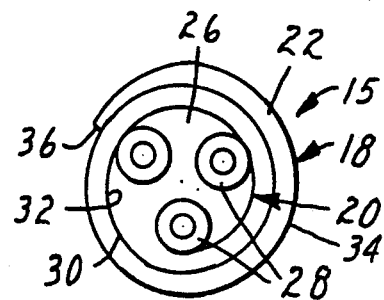
FIG. 5 is an end view of an end seal according to the present invention with the tail portion wrapped about the core portion and three cables.

FIG. 5 illustrates the tail portion 22 wrapped about a core portion 20c with the tail portion 22 making more than one wrap about the core portion 20, and three cables 28 disposed in the seal.

Figure 6:
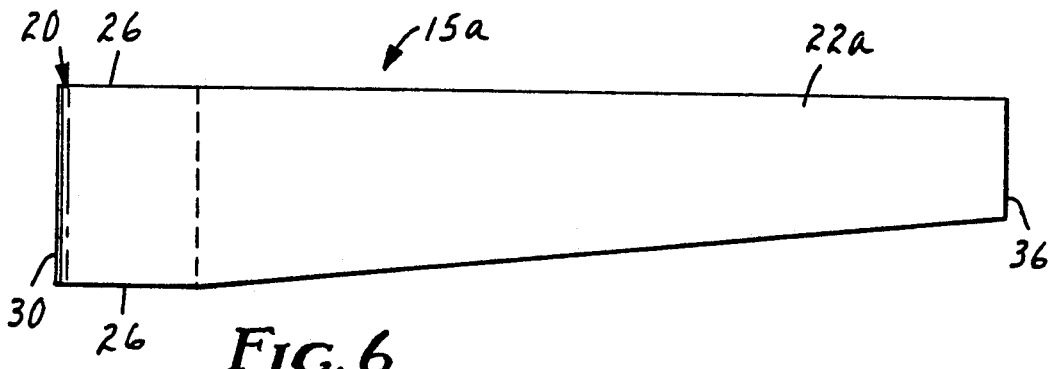
FIG. 6 is a bottom view of the end seal according to the present invention.

FIG. 6 illustrates that the tail portion 22a can also taper in the lengthwise direction to change the width of the tail portion such that it becomes narrower near the free end 36.

Figure 7:
FIG. 7 is a sectional view of a tail portion from a location as illustrated by lines 7—7 of FIG. 1.

FIG. 7 illustrates that the tail portion 22b, whether of uniform width or of decreasing width, can also taper in the transverse direction to cause the interior end of the seal to have a different outside diameter than at the outer end, resulting in a tapered or cone shaped end seal. In this embodiment the opposite edges of the tail portion 22b have different thicknesses along the length of the tail portion. Further, the thickness or dimension of the edges may decrease toward the free end. The tail portion is adapted to make a plurality of wraps about the core portion.

Figure 8:
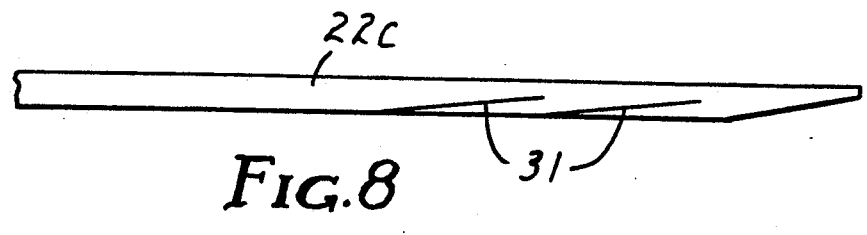
FIG. 8 is a detail view of a tail portion of an end seal modified to permit easy shortening.

FIG. 8 illustrates a tail portion 22c which is provided with preformed slits 31 which permit the tail portion 22c to be easily torn to a different length by separating the end portion beyond a slit 31.

Figure 9:
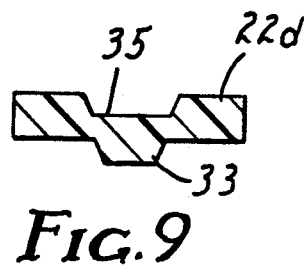
FIG. 9 is another cross sectional view taken long line 7—7 of FIG. 1 illustrating another modification of the tail portion of the end seal.

As illustrated in the transverse sectional view in FIG. 9, the tail portion 22d can also be formed with mating ridges or ribs 33 and grooves 35, formed in opposite surfaces of the tail portion 22d. In this embodiment the ridge 33 is of trapezoidal shape and extends along the outer surface of the tail portion when it is wrapped and on subsequent wraps, the groove 35 covers the ridge 33 to increase the path along the seal between the wraps and the frictional coefficient such that the axial force along the axis of the end seal is greater and the wraps of the tail portion 22 cannot slide or telescope in relationship to each other.

Figure 10:
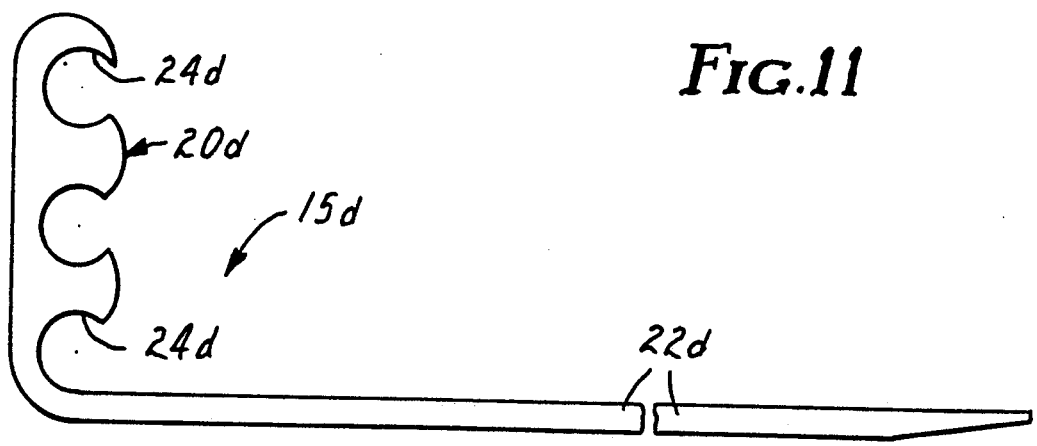
FIG. 10 is an end view of a further embodiment of an end seal incorporating the present invention.

FIG. 10 illustrates an end seal 15d with a core portion 20d which is oblong as opposed to generally circular. The core portion 20d is a shape which has generally convex surfaces such that the tail portion 22 can be tightly wrapped about the exterior surface to form a moisture seal for the closure. The core portion 20d is formed with a plurality of cable receiving openings 24d.

Figure 11:
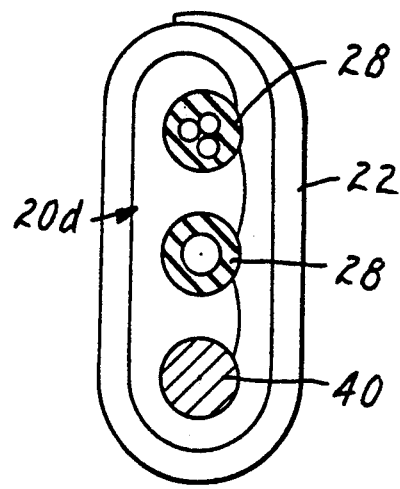
FIG. 11 is an end view of the end seal of FIG. 10 wrapped about two wires and a plug used to block one of the openings.

In FIG. 11, the end seal 15d is shown with a pair of cables 28, with one or more conductors, placed in two of the openings 24d and a plug 40 is illustrated in the third opening to show that the end seals of the present invention are versatile and if a wire is not required the seal will still function and a plug, such as a solid cylindrical member can be placed in the additional opening with the tail portion wrapped therearound and the same seal is made for the closure. When pressure is to be applied to the seal, the opening 24d can be formed with grooves in its inner surface, which extend about its axis, and the plug 40 can be formed with ribs circling the outer cylindrical surface, which mate with the grooves, such that the plug is not easily driven out of the opening 24d.

Typical ranges for the opening diameter and the size of cable accommodated are as follows:

| CORE HOLE DIAMETERS | |
|---|---|
| CORE DIAMETER HOLES | CABLE RANGE |
| .20" | .30–1.5" |
| .40" | .50–1.75" |
| .65" | .75–2.0" |
| .90" | 1.00–2.75" |
| 1.00" | 1.10–3.50" |
| 1.00" | 1.10–3.50" |
| 1.50" | 1.60–4.00" |

EXAMPLE 1

A spiral end seal of the invention was made by mixing the following composition

| Henkel DDI 1410 | 6.5 g |
|---|---|
| Poly bd R45HT | 20.2 g |
| Hycar TM 1300 × 21 | 5.3 g |
| BiCat 8 | 0.8 g |
| Emery 3006 | 22.9 g |
| Irganox TM 1076 | 1.0 g |
| Scotchlite TM B23/500 | 10.0 g |
| Cab-O-Sil TM M5 | 1.0 g |
| Soybean Oil | 30.3 g |
| Vulcan TM 9A32 Carbon Black | 2.0 g |

The formulation was mixed at 23° C. and poured into a mold constructed of thermoformed plastic in the shape illustrated in FIG. 2. The formulation was allowed to cure for 24 hours at 23° C. to form a gel, and then removed from the mold. The resultant end seal had a core diameter of about 2 inches (5.1 cm), the tail length was 13 inches (33 cm), and the seal width was 2.0 inches (5.1 cm). The two openings within the core each had a diameter of 0.65 inches (1.65 cm). The gel material had a Shore 00 hardness of 21.4.

A resultant gel of Example 1 is a polyureaurethane, and from the formulation of Example 1, the ranges for the ingredients are from abut 10 to about 30% of the hydroxyl terminated polybutadiene (the. Poly bd R45HT), from about 2 to about 20% of a difunctional amine terminated butadiene acrylonitrile polymer (Hycar 1300 x21), from about 3 to about 8% $C_{36}$ dimer acid diisocyanate (the Henkel DDI 1410), from about 25 to about 50% vegetable oil (Soybean oil), from about 15 to about 40% polyalphaolefin (Emergy 3006), from about 0.5 to about 5% silica (the Cab-O-Sil M5), from about 0.5 to about 5% antioxidant (the Irganox 1076), from about 0.1 to about 5% zinc catalyst (BiCat 8), and from about 5 to about 25% glass microbubbles (Scotchlite B23/500).

The body of the seal formed is a gel having a Shore 00 hardness of from about 10 to about 50, and elongation of greater than 100%, and a density of less than about 0.8 gm/cc, having an isocyanate index of less than 100.

EXAMPLE 2

An end seal of the present invention was constructed from a cross-linked butyl rubber mastic, available as "GS7500 Cross Linked Sealant" from General Sealants, Inc. The sealant material was placed into the mold described in example 1 by layering mastic strips. The mastic was formed into a void free, cohesive mass having the shape illustrated in FIG. 2 by compressive force on the open side of the mold. The mastic material had a Shore 00 hardness of 38.

EXAMPLE 3

An end seal similar to that described in Example 1 above was constructed by die-cutting the shape from a vinyl-nitrile/neoprene closed cell foam material available as Ensolite IVI from Uniroyal Plastics Company.

EXAMPLE 4

An end seal similar to that in Example 1, was compression molded from a nitrile rubber composition designated as "MS-4648C", available from Neff-Perkins Company. The seal was molded using conventional methods in a steel mold. The rubber formulation had a Shore A hardness of 20.

EXAMPLE 5

The seals from Examples 1 though 4 were tested according to the following procedure:

A test splice closure was constructed employing the Closure Body Assembly from the Armorcast TM Buried Closure-Direct Injection (ABC-DI) 3.0–12 product available from 3M. This closure body assembly is a cylindrically formed, longitudinally split polyethylene sheet having conically shaped ends and two ports located on the body for use in encapsulating compound injection and pressure monitoring.

The ends were trimmed so that when the closure body was installed, the diameters of the openings were about 2.5 inches (6.4 cm). Two lengths of polyethylene single sheath unfilled telephone cable (100 pair/24 gauge) were used to construct the test closure. The test closure assembly had one cable exiting from one end and two cables exiting from the other end of the closure body assembly. All cable ends were capped.

The end seals of Examples 1–4 were wrapped around the cables and position so that the seals would be located beneath the conical ends of the assembly when installed. On the end having only a single cable exiting, a plug made of the same material as the end seal was used. The completed end seals were about 3.2 inches (8.1 cm) in diameter.

The closure body assembly was then installed and sealed according to the product instructions. Two worm-drive compression bands were placed on the closure near the ends to further maintain the closure. The test closure was then filled with 4442 HiGel TM encapsulating compound available from 3M. None of the closures leaked. A pressure injection caulking gun was used to place 15 psi (1.05 kg/cm$^2$) pressure on the encapsulant. Again, no leakage of compound was observed from the ends of any closure assembly.

Having described the present invention with regard to several embodiments, it will be appreciated that those skilled in the art may find modifications not described but all such modifications are contemplated that come within the scope of the appended claims.

I claim:

1. An end seal, adapted to seal the space between cables and between the cables and a closure to restrict fluid transfer through the seal, comprising:
   a body of an elastic, flexible material having
   a core portion having an outer peripheral surface and spaced ends, and wall means forming at least a pair of cylindrical openings through said core portion extending between said ends, with one edge of each opening communicating with the outer peripheral surface of the core portion to define an entrance slot to each opening from the edge of the core portion, and an extended tail portion having opposite surfaces, joined by side edges, and a free end, the tail is integral with and extends from the surface of the core portion with one surface being formed tangential to said wall means forming one of said openings, said tail portion having sufficient length to wrap about said peripheral surface of the core portion to cover all the entrance slots of the openings and the cables to be placed therein, with said free end of the tail portion tapering to an end of reduced thickness.

2. An end seal according to claim 1 wherein there are openings of various arcuate dimensions formed in the core portion in peripherally spaced relationship.

3. An end seal according to claim 1 wherein the end seal is formed of a material having an inherent self-adhesive property such that there is created a high frictional coefficient between the tail and the core and between wraps of the tail about the core portion.

4. An end seal according to claim 1 wherein the tail portion is tapered along its length such that the width of the tail portion at the free end is narrower than adjacent the core portion.

5. An end seal according to claim 1 wherein said tail portion is tapered transversely of the width thereof such that one edge becomes increasingly thinner than the other edge along the length of the tail portion.

6. An end seal according to claim 4 wherein said tail portion is tapered transversely of the width thereof such that one edge becomes increasingly thinner than the other edge along the length of the tail portion.

7. An end seal according to claim 1 wherein said tail portion is provided with oblique slits in spaced relationship along its length to afford easy shortening of the length of the tail if the diameter of the closure end is smaller than the diameter of the core portion with the entire tail portion wrapped about the core portion.

8. An end seal according to claim 1 wherein said core portion is generally circular.

9. An end seal according to claim 2 wherein the core portion is generally circular.

10. An end seal according to claim 1 wherein said core portion is generally oblong.

11. An end seal according to claim 3 wherein said core portion is generally oblong.

12. An end seal according to claim 1 wherein the tail portion is formed with a rib on one surface and a groove on the opposite surface such that upon wrapping the tail portion about the core portion, the mating rib and groove increase the frictional forces needed to slide the wrapped portions axially of the openings.

13. An end seal according to claim 1 wherein said body of elastic, flexible material is selected from the group consisting of gels, elastomers, mastics and foams.

14. An end seal according to claim 13 wherein said body is a gel having a Shore 00 hardness of from about 10 to about 50, an elongation of greater than 100%, and a density of less than about 0.8 gm/cc.

15. An end seal according to claim 13 wherein said gel comprises at least one diisocyanate and at least one isocyanate reactive material selected from the group consisting of polyols, polymer polyols, and polymeric amines, wherein said gel has an isocyanate index of less than 100.

16. An end seal according to claim 15 wherein said gel comprises a polyureaurethane.

17. An end seal according to claim 15 wherein said gel comprises from about 10 to about 30% of a hydroxyl terminated polybutadiene, from about 2 to about 20 of a difunctional amine terminated butadiene acrylonitrile polymer, from about 3 to about 8% $C_{36}$ dimer acid diisocyanate, from about 25 to about 50% vegetable oil, from about 15 to about 40% polyalphaolefin, from about 0.5 to about 5% silica, from about 0.5 to about 5% antioxidant, from about 0.1 to about 5% zinc catalyst, and from about from about 5 to about 25% glass microbubbles.

* * * * *